April 3, 1934.  V. N. JENKINS ET AL  1,953,612
TREATING HYDROCARBON OILS
Filed July 9, 1928   2 Sheets-Sheet 1
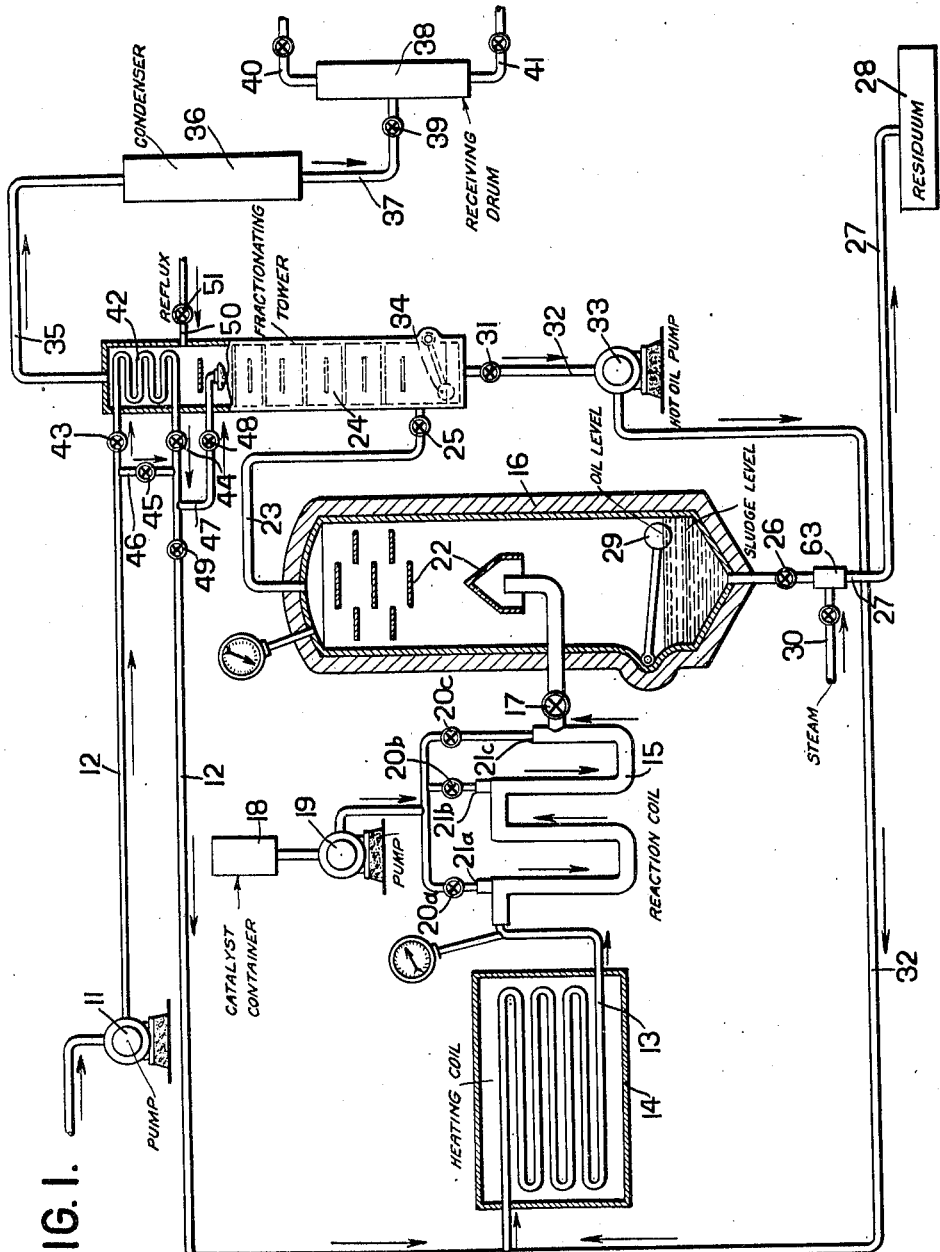
FIG. I.

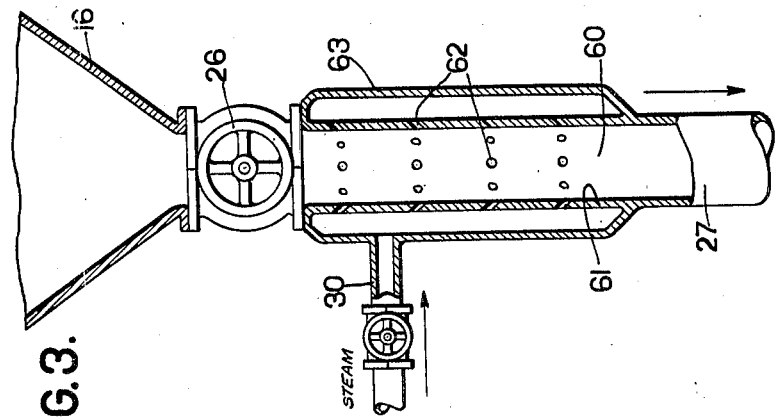
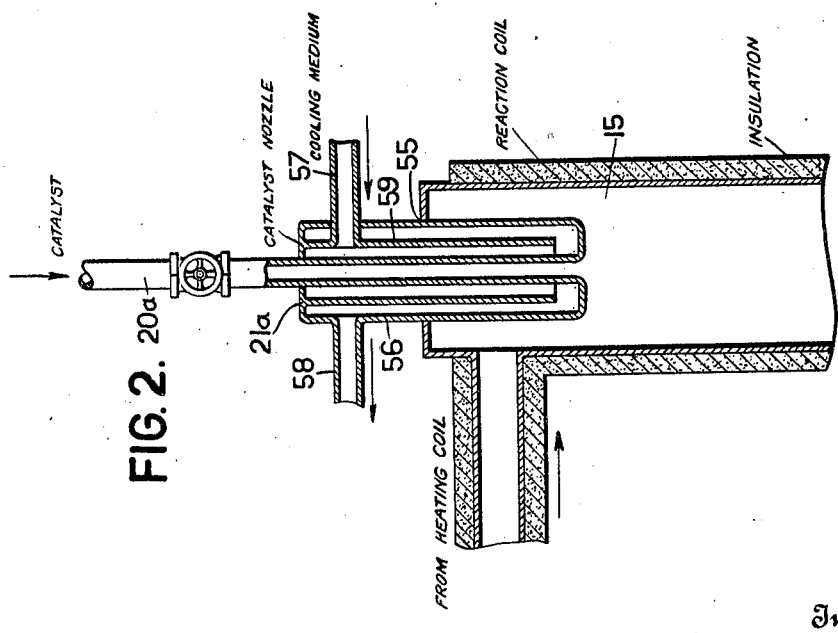

Patented Apr. 3, 1934

1,953,612

UNITED STATES PATENT OFFICE 1,953,612

TREATING HYDROCARBON OILS

Vance N. Jenkins, Elizabeth, N. J., and William M. Stratford, Port Arthur, Tex., assignors to The Texas Company, New York, N. Y., a corporation of Delaware Application July 9, 1928, Serial No. 291,183

3 Claims. (Cl. 196—54)

This invention relates to treating hydrocarbon oils and more particularly to the conversion of higher boiling hydrocarbon oils into lower boiling oils through the action of an aluminum chlorid catalyst under elevated temperature.

Broadly the invention comprises a process wherein higher boiling hydrocarbon oil is heated to a temperature suitable for conversion, preferably under superatmospheric pressure, and is thereafter mixed with an aluminum chlorid catalyst whereby conversion is effected, after which the lower boiling oils thus produced, together with the bulk of the unconverted oil, are separated from the spent catalyst by distillation.

In one form of the invention the higher boiling oil to be converted may be heated to a cracking temperature, that is, to a temperature at which, if maintained for any appreciable length of time, decomposition will take place, thereafter being brought into contact with the catalyst whereby the conversion reaction is caused to take place with great rapidity.

In one form of the invention the oil may be heated to a suitable conversion temperature in a continuous elongated heating coil and may then be mixed with an aluminum chlorid catalyst and thereafter passed through a separate reaction coil, preferably unheated, whereby the conversion reaction is allowed to take place substantially to completion before the oil and the catalyst are discharged into the distillation zone.

In one form of the invention the spent catalyst and the distillation residues consisting of the heavier and less volatile products of the cracking reaction may be withdrawn from the distillation zone in the presence of steam to effect decomposition of the material thereby preventing the formation of solid deposits obstructing the draw-off lines and other parts of the apparatus.

The invention may be readily understood from a consideration of the process in connection with the accompanying figures of the drawings which represent novel apparatus within the invention and adapted for carrying on the process.

In the drawings, Figure 1 represents in diagrammatic elevation the general form of the apparatus.

Figure 2 is a more detailed elevation, partly in section, of a portion of the reaction coil and the nozzles for the introduction of the catalyst, and Figure 3 is a sectional elevation of the arrangement by which the spent catalyst and residual material may be withdrawn from the expansion chamber in the presence of steam.

Referring to the drawings, Figure 1, a pump 11 is provided for forcing the charging oil from a source (not shown) to the cracking system. The oil travels through the charging line 12 to the heating coil 13 positioned within a suitable furnace 14. A reaction coil 15 connects directly to the heating coil 13, discharging into the expansion chamber 16, the discharge end of the reaction coil being provided with a valve 17.

Means are provided for supplying the catalyst to the reaction coil 15, consisting of a source of supply as the tank 18, a pump 19 and the valved connections 20a, 20b, 20c, and 20d, which enter the reaction coil through the corresponding nozzles 21a, 21b, 21c, and 21d, provided with suitable cooling means. The cooling means are not shown in Figure 1 but are shown in detail in Figure 2 of the drawings, which will be more fully discussed hereinafter.

The expansion chamber 16 is provided with suitable baffles 22 in the upper portion. At the top of the chamber the vapor line 23 leads to the fractionating tower 24 and is provided with a valve 25 whereby a pressure differential may be maintained between the chamber and the tower. The expansion chamber is preferably heavily insulated and is provided with a valve 26 at the lower end for the withdrawal of sludge and residual products through the line 27 to the storage tank 28. A float mechanism 29 is provided for indicating the level of the oil in the expansion chamber and may, if desired, be connected to operate the valve 26 to automatically maintain a constant liquid level in the chamber.

The device 60 for withdrawing sludge, of which the valve 26 forms a part, is provided with a steam connection 30. The construction of the device for withdrawing sludge is not shown in detail in Figure 1 but is clearly shown in Figure 3 of the drawings and will be more fully described in connection with the discussion of Figure 3.

The fractionating tower 24 is provided with a draw-off valve 31 at the lower end and a line 32 leading to the hot oil pump 33 whereby the condensate collected in the lower portion of the tower may be pumped back through an extension of the line 32 to the heating coil 13. A float mechanism 34 serves to indicate the liquid level in the lower portion of the fractionating tower and may be connected to the valve 31 so as to automatically maintain a constant liquid level. A vapor line 35 leads from the upper portion of the fractionating tower 24 through the condenser 36 and the line 37 to the receiving drum 38. A valve 39 is provided in the line 37 for maintaining a pressure differential between the condenser 36 and the receiving drum 38. The receiving drum 38 is provided with connections 40 and 41 for withdrawal of gas and condensate, respectively.

A coil 42 is provided in the top of the tower 24 and is connected into the charging line 12, proper valves 43, 44, and 45 being provided so that the charge may be passed through the coil 42, or by-passed through the line 46. A line 47 is provided connecting the charging line 12 to the interior of the fractionating tower 24 whereby, if desired, the charge may be introduced directly into the fractionating tower. Valves 48 and 49 are provided for the regulation of such operation. A connection 50 is provided at the upper portion of the fractionating tower 24 whereby a liquid reflux medium may be directly introduced into the tower, the quantity being regulated by means of the valve 51.

The operation of the process in connection with the apparatus described may be as follows: A charging stock suitable for conversion, which may be a kerosene or gas oil fraction of petroleum, is forced by means of the charging pump 11 through the charging line 12 to the heating coil 13. If desired, the valve 45 may be closed and the valves 43, 44, and 49 opened whereby the oil charge may be passed through the coil 42 located in the top of the tower 24 and will thus be heated by exchange of heat from the vapors in the tower. As moisture will decompose the aluminum chlorid catalyst it is desirable that the oil charge be substantially moisture-free.

In the heating coil 13 the oil is heated to a desired conversion temperature which may range for example, from 600° F. up to 850° or 900° F., depending somewhat upon the characteristics of the charging oil and of the quantity of catalyst used, as will be discussed more in detail hereinafter. A temperature of 750° F. or higher at which pyrolytic decomposition will take place in a practicable length of time is the most desirable temperature. A superatmospheric pressure is maintained on the coil 13 to retard vaporization and improve the heat transfer to the oil. For example, a pressure of 100 to 150 pounds per square inch may be maintained at the outlet of the heating coil while the pressure at the inlet of the coil would be correspondingly higher due to the frictional resistance offered by the coil to the flow of the oil therethrough.

From the heating coil 13, the hot oil enters the reaction coil at the point 20a, at which point is located the first of the series of nozzles 21a, 21b, etc. for introducing catalyst into the heated oil. The reaction coil 15 is provided for the purpose of mixing the catalyst and the heated oil and also it is intended that the greater part of the conversion shall take place within the reaction coil. As the rate of the conversion reaction will vary more or less in proportion to the temperature of the oil, the reaction coil is provided with the several catalyst nozzles at various positions, as shown in the drawings, whereby the catalyst may be introduced into the coil either at its beginning through the nozzle 21a, or at an intermediate point through the nozzle 21b, or, in the case where the oil is heated to comparatively very high temperatures, the catalyst may be introduced through the nozzle 21c, thereby practically by-passing the reaction coil 15 as far as the catalyst is concerned.

The catalyst container 18 may serve as the source of a suitable aluminum chlorid catalyst such for example as a liquid, substantially non-volatile, aluminum chlorid-hydrocarbon compound produced by reacting aluminum chlorid vapors with hydrocarbon oil. A suitable process for preparing such an aluminum chloride catalyst is disclosed in United States Letters Patent No. 1,647,445, issued November 1, 1927, to Frank W. Hall, for Treating oil with aluminum chloride. The catalyst may be forced to the nozzles 21a, 21b, etc. by means of the pump 19, the flow being controlled through the manipulation of the valves 20a, 20b, etc. The construction of the nozzles 21a, 21b, etc. for introducing the catalyst into the hot oil is illustrated in detail in Figure 2 of the drawings. Referring to Figure 2, there is shown a section of the reaction coil 15 with its connection to the heating coil 13. The catalyst nozzle 21a projects into the reaction coil 15 at the point 55. The catalyst nozzle is fitted with a cooling jacket 56 and connections 57 and 58 for the respective introduction and withdrawal of a cooling fluid. A baffle 59 is provided so that the cooling fluid passes completely around the catalyst nozzle thus providing sufficient cooling to prevent decomposition of the catalyst prior to its contact with the hot oil.

The quantity of catalyst introduced into the reaction coil may vary somewhat with the degree of conversion desired and the characteristics of the oil undergoing conversion but will ordinarily amount to a quantity equivalent to a content of aluminum chlorid equal to about two to ten per cent by weight of the oil charge. The temperature at which the conversion takes place will also vary, as has been mentioned before. As the temperature increases the reaction becomes more rapid and with temperatures in the neighborhood of 900° F. the conversion reaction takes place almost instantaneously. Thus, if it is desired to carry on the conversion at a temperature of about 600° F. the catalyst will be introduced through the nozzle 21a and in comparatively large amount, whereas if the higher temperature of conversion is used the quantity of catalyst may be somewhat reduced and may, in addition, be introduced through the nozzle 21b or at 21c, the increased speed of reaction being such that the greater portion of the conversion will have taken place before the oil is discharged through the valve 17 into the expansion chamber 16.

The reaction coil 15 is preferably insulated to prevent the radiation of heat, the total heat required for the conversion reaction being supplied through the heating coil 13 which makes unnecessary any heat transfer through the reaction coil 15 thereby eliminating any possibility of deposition and baking-on of carbonaceous sludge deposits upon the inner surface of the reaction coil. The reaction coil is preferably maintained under a superatmospheric pressure which may be equal to the pressure at the outlet of the heating coil 13. The valve 17 may be partially closed, however, so that a relatively lower pressure is maintained in the expansion chamber 16, thereby causing the conversion reaction to take place under pressure, after which the oil and catalyst are discharged into the expansion chamber under reduced pressure thereby causing distillation to take place.

The discharge of the oil into the expansion chamber under reduced pressure and at high temperature causes the bulk of the oil to flash into vapor. The baffles 22 are so arranged as to prevent the mechanical carrying over of the heavier residual oils produced in the conversion together with the spent catalyst, and these are collected in the lower portion of the expansion drum 16 where they ordinarily form two liquid layers, the sludge or spent catalyst below, with the oil above. The liquid levels are maintained substantially constant as indicated by the float 29 through manipulation of the valve 26 which may, if desired, be directly connected to the float 29 and operated therefrom.

Ordinarily the withdrawal of aluminum chlorid sludge and residual products of the reaction from a distillation chamber maintained at elevated temperatures is somewhat difficult, as the materials tend to solidify upon cooling, forming deposits in the lines which readily become plugged up. For this reason a special device 60 is provided which is so arranged that steam is injected directly into the mass being withdrawn from the expansion chamber.

The construction of the device 60 is illustrated in detail in Figure 3 of the drawings where the valve 26 is shown attached to the lower portion of the expansion chamber 16. The device 60 is shown in section as consisting of a tube 61 provided with a series of holes or slots 62, the longitudinal axes of which are inclined at an angle to the axis of the tube 61. A steam jacket 63 surrounds the perforated portion of the tube 61 and is provided with a steam inlet 30 whereby steam pressure may be maintained on the outside of the tube 61 and steam injected therein through the perforations 62. By the injection of steam into the spent catalyst and residual material at the elevated temperature prevailing, decomposition of the sludge takes place whereby the tendency to form deposits along the walls of the pipes through which the material is drawn is practically eliminated and the material thus withdrawn from the lower portion of the expansion chamber 16 is easily discharged through the line 27 to the storage tank 28.

The oil vapors from the expansion chamber 16 pass through the vapor line 23 to the fractionating tower 24. Ordinarily it is desirable to maintain a slight superatmospheric pressure upon the expansion chamber 16, which may be of the order of about ten to twenty-five pounds per square inch, and accordingly the valve 25 may be partially closed to maintain such pressure. The evolution of vapors taking place in the drum 16 may be so violent as to carry over a small quantity of the catalyst by entrainment and accordingly, if necessary, a suitable trap may be placed in the run-back line 32 whereby such entrained portions of the catalyst may be separated from the oil, it being particularly undesirable that any catalyst be present in the oil passing through the heating coil 13 as this would result in decomposition within the coil with consequent deposition therein of carbon.

Within the fractionating tower 24, fractional distillation takes place, the upward rising vapors being cooled to such degree that the vapors evolved from the top of the tower boil within the desired range, preferably within the normal range of gasoline. The cooling applied to the top of the tower may be derived from the introduction of an extraneous material, such for example as a liquid condensate of the vapors evolved from the tower, through the connection at 50 or, if the charge is passed through the coil 42, the cooling may be derived from the exchange of heat from the vapors to the oil charge passing through the coil. In an alternative procedure the cold oil charge may be introduced directly into the tower through the connection 47 thereby furnishing reflux cooling for the tower and at the same time preheating the oil charge which thereafter collects in the lower portion of the tower and may be pumped to the heating coil through the line 32 by means of the hot oil pump 33. Such procedure may be especially desirable in that any low boiling constituents of the charge oil may thus be stripped out during the passage of the charge through the tower and in addition, any traces of moisture contained in the charge will also be stripped out and pass off with the oil vapors through the vapor line 35, thereby assuring that the oil passing through the heating coil and into the reaction coil, in contact with the catalyst, will be thoroughly dried.

The vapors from the fractionating tower 24 pass off through the vapor line 35 to the condenser coil 36 and thence to the receiving drum 38. In the cracking reaction a certain quantity of non-condensable gas may be formed which is separated from the condensate in the receiving drum 38 and may be withdrawn through the connection 40, the condensate being withdrawn to storage through the connection 41.

Obviously many modifications and variations of the invention, as hereinbefore set forth, may be made without departing from the spirit and scope thereof, and therefore, only such limitations should be imposed as are indicated in the appended claims.

We claim:

1. The process of converting higher boiling hydrocarbon oils into lower boiling oils which comprises heating the oil while maintained under superatmospheric pressure to a temperature at which conversion would occur substantially instantaneously in the presence of an aluminum chloride-hydrocarbon catalyst, then mixing the heated oil with from 2 to 10% of an aluminum chloride-hydrocarbon catalyst, contacting the oil and catalyst for a minimum time to effect the conversion reaction, then subjecting the products of the conversion reaction to vaporization and separating the vapors of the lower boiling hydrocarbon oils formed.

2. The process of converting higher boiling hydrocarbon oils into lower boiling oils such as gasoline which comprises passing the oil to be converted under superatmospheric pressure through a heating coil whereby the oil is rapidly raised to a temperature in the neighborhood of 900° F. without permitting substantial cracking, mixing from 2 to 10% of an aluminum chloride-hydrocarbon catalyst with the heated oil, passing the mixture of oil and catalyst through a reaction coil wherein the oil undergoes conversion, substantially instantaneously reducing the pressure and expanding the mixture to effect vaporization of the low boiling conversion products, fractionating the vapors and separating a condensate of the nature of gasoline.

3. The process of converting a hydrocarbon oil boiling within the boiling range of kerosene and gas oil to a lower boiling oil such as naphtha which comprises heating the oil while maintained under superatmospheric pressure to a temperature at which pyrolytic decomposition will take place in a practicable length of time without permitting substantial cracking, then subjecting the heated oil to the action of from 2 to 10% of an anhydrous aluminum chloride-hydrocarbon catalyst whereby the conversion reaction is effected at a rate approaching instantaneity and then separating the vapors of the lower boiling hydrocarbon oils formed.

VANCE N. JENKINS.
WILLIAM M. STRATFORD.